(12) United States Patent
Yeum

(10) Patent No.: US 8,905,390 B2
(45) Date of Patent: Dec. 9, 2014

(54) APPARATUS FOR CLAMPING PANEL FOR VEHICLE

(75) Inventor: Jung Whan Yeum, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 417 days.

(21) Appl. No.: 13/526,901

(22) Filed: Jun. 19, 2012

(65) Prior Publication Data

US 2013/0113149 A1    May 9, 2013

(30) Foreign Application Priority Data

Nov. 7, 2011    (KR) .................... 10-2011-0115153

(51) Int. Cl.
*B23Q 3/18*    (2006.01)
*B23K 37/04*    (2006.01)

(52) U.S. Cl.
CPC ....... *B23K 37/0443* (2013.01); *B23K 2201/006* (2013.01)
USPC .................................. 269/59; 269/55; 269/58

(58) Field of Classification Search
USPC ................................................ 269/55, 58, 59
See application file for complete search history.

(56) References Cited

U.S. PATENT DOCUMENTS

| | | | |
|---|---|---|---|
| 6,874,670 B2 * | 4/2005 | Toba et al. | 228/44.3 |
| 2004/0167647 A1 * | 8/2004 | Ghuman et al. | 700/97 |

FOREIGN PATENT DOCUMENTS

| | | |
|---|---|---|
| JP | 08040325 A | 2/1996 |
| JP | 8197149 A | 8/1996 |
| JP | 2001286953 A | 10/2001 |
| JP | 2002-225759 A | 8/2002 |
| JP | 2002274451 A | 9/2002 |
| JP | 2005289326 A | 10/2005 |
| KR | 10-2010-0122754 A | 11/2010 |
| KR | 10-2011-0028128 | 3/2011 |

* cited by examiner

*Primary Examiner* — Lee D Wilson
*Assistant Examiner* — Shantese McDonald
(74) *Attorney, Agent, or Firm* — Edwards Wildman Palmer LLP; Peter F. Corless

(57) ABSTRACT

Disclosed is an apparatus for clamping a panel comprising: a base frame; first movable units mounted on left and right portions of the base frame and adapted to reciprocate first sliding plates between the left and right; second movable units mounted on front and rear portions of the base frame between the first movable units and adapted to reciprocate second sliding plates between the front and rear; first clamping units movable between the left and right through the first sliding plates, and movable upward and downward through first vertically-movable means; a second clamping unit movable between the front and rear through the second sliding plate and movable upward and downward through second vertically-movable means; and a third clamping unit movable between the front and rear through the second sliding plate and movable upward and downward through third vertically-movable means.

24 Claims, 11 Drawing Sheets

APPARATUS FOR CLAMPING PANEL FOR VEHICLE

CROSS-REFERENCE TO RELATED APPLICATION

This application claims priority to and the benefit of Korean Patent Application No. 10-2011-0115153 filed in the Korean Intellectual Property Office on Nov. 7, 2011, the entire contents of which are incorporated herein by reference.

BACKGROUND OF THE INVENTION (a) Field of the Invention

The present invention relates to an apparatus for clamping a panel for a vehicle. More particularly, the present invention relates to an apparatus which can clamp a panel, such as a tailgate and a trunk lid, regardless of dimension and surface curvature of the panel. The present apparatus can, thus, clamp panels having different sizes and shapes according to the vehicle model.

(b) Description of the Related Art

Generally, twenty to thirty thousand components are sequentially assembled during the manufacture a vehicle.

Particularly, after panels are manufactured through various press apparatus, the panels are then transported to a vehicle body factory at a first stage of a vehicle manufacturing process. The panels are assembled together so as to form a vehicle body of a body in white (B.I.W) shape.

In an assembly factory, a side panel, a roof panel, a rear panel, and so on are first mounted to a floor of the vehicle body through a main body process. Thereafter, the vehicle body is painted through a painting process, followed by assembling an engine, a transmission, and interior and exterior materials thereto.

In particular, each panel forming the vehicle body is manufactured through pressing. After the panels are settled on and secured by a clamping apparatus, the panels are assembled, welded, hemmed, and so on in a vehicle body factory, followed by the painting process.

Since the panels, however, have different shapes and sizes according to the particular vehicle model, it is difficult to use a single conventional clamping apparatus. Therefore, individual clamping apparatus are typically required for various vehicle models.

If individual clamping apparatus are used, costs are incurred for either adjusting the clamping apparatus or for manufacturing a new clamping apparatus when a new vehicle model is manufactured. In addition, this can result in the structure of the clamping apparatus becoming more complex.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for clamping a panel for a vehicle having advantages of clamping a variety of panels, such as tailgates and trunk lids regardless of the dimension and surface curvature of the variety of panels. The present apparatus is further capable of clamping panels for a variety of vehicle models, which typically have different shapes and sizes.

An apparatus for clamping a panel for a vehicle according to an embodiment of the present invention may include: a base frame; first movable units mounted respectively on left and right portions of the base frame and adapted to reciprocate first sliding plates on the base frame between the left and the right portions; second movable units mounted respectively on front and rear portions of the base frame between the first movable units and adapted to reciprocate second sliding plates on the base frame between the front and the rear portions; first clamping units adapted to be movable between the left and the right portions on the base frame through the first sliding plates and to be movable upward and downward through first vertically-movable means so as to clamp both sides of the panel settled/disposed on upper portions of the first clamping units; a second clamping unit adapted to be movable on the base frame between the front and the rear potions through the second sliding plate of the second movable unit and to be movable upward and downward through second vertically-movable means so as to clamp a front side of the panel; and a third clamping unit adapted to be movable on the base frame between the front and the rear portions through the second sliding and to be movable upward and downward through third vertically-movable means so as to clamp a rear side of the panel.

According to various embodiments, the first movable unit may include: a first rail housing mounted on the base frame from the left to the right and having an upper portion to which a first sliding plate is slidably coupled; a first drive motor mounted on the base frame at a side of the first rail housing and having a rotational shaft connected to a first ball screw; a first guide rail mounted on the base frame in the first rail housing through a first plate; and a first rail block connected to the first sliding plate, and having an interior in which the first ball screw is insertable so as to be reciprocated along the first guide rail when the first ball screw is rotated by operation of the first drive motor.

According to various embodiments, a first brake may be mounted between the rotational shaft of the first drive motor and the first ball screw.

According to various embodiments, the second movable unit may include: a second rail housing mounted on the base frame from the front to the rear and having an upper portion to which a second sliding plate is slidably coupled; a second drive motor mounted on the base frame at a side of the second rail housing and having a rotational shaft connected to a second ball screw; a second guide rail mounted on the base frame in the second rail housing through a second plate; and a second rail block connected to the second sliding plate, and having an interior in which the second ball screw is insertable so as to be reciprocated along the second guide rail when the second ball screw is rotated by operation of the second drive motor.

According to various embodiments, a second brake may be mounted between the rotational shaft of the second drive motor and the second ball screw.

According to various embodiments, the first vertically-movable means may include: a first supporting post mounted on an upper portion of the first sliding plate; a third rail housing mounted at the first supporting post and to which a third sliding plate is slidably coupled; a third drive motor mounted at a lower end of the third rail housing and having a rotational shaft connected to a third ball screw; a third guide rail mounted at the first supporting post in the third rail housing through a third plate; and a third rail block connected to the third sliding plate, and having an interior in which the third ball screw is insertable so as to be reciprocated along the third guide rail when the third ball screw is rotated by operation of the third drive motor.

According to various embodiments, a third brake may be mounted between the rotational shaft of the third drive motor and the third ball screw.

According to various embodiments, the first clamping unit may include: a first mounting frame mounted at the third sliding plate of the first vertically-movable means; a connecting frame connected to the first mounting frame through a connecting block and having an upper portion at which a slot is formed along a length direction thereof; a first operating cylinder having an operating rod and having a lower end fixedly mounted at a lower portion of the connecting frame through a fixing block; a first clamping cylinder having an operating rod, a lower end connected to an upper end of the operating rod of the first operating cylinder, and an upper portion at which a first clamper body is mounted, a lower portion of the first clamper body being connected to the slot so as to be movable upward and downward by operation of the first operating cylinder; a first clamper having a side in connection with (such as through a hinge) an upper portion of the first clamper body and a rear end in connection with (such as through a hinge) the operating rod of the first clamping cylinder; and a first pusher mounted at a front end of the first clamper so as to apply pressure to an upper portion of the panel.

According to various embodiments, the first pusher may include: a first pusher rod disposed at the front end of the first clamper and being slidably mounted at the first clamper in a state of passing through the first clamper; a pusher end fixedly mounted at a lower end of the first pusher rod and adapted to be in contact with the upper portion of the panel; and a first elastic member disposed between the first clamper and the pusher end so as to apply elastic force to the pusher end.

According to various embodiments, a settling pad for mounting a lower portion of the panel may be mounted at an upper end of the first mounting frame.

According to various embodiments, the second vertically-movable means may include: a second supporting post mounted on an upper portion of the second sliding plate; a fourth rail housing mounted at the second supporting post and to which a fourth sliding plate is slidably coupled; a fourth drive motor mounted at a lower end of the fourth rail housing and having a rotational shaft connected to a fourth ball screw; a fourth guide rail mounted at the second supporting post in the fourth rail housing through a fourth plate; and a fourth rail block connected to the fourth sliding plate, and having an interior in which the fourth ball screw is insertable so as to be reciprocated along the fourth guide rail when the fourth ball screw is rotated by operation of the fourth drive motor.

According to various embodiments, a fourth brake may be mounted between the rotational shaft of the fourth drive motor and the fourth ball screw.

According to various embodiments, the second clamping unit may include: a first connecting plate mounted at the fourth sliding plate of the second vertically-movable means; a first locator mounted at the first connecting plate and being adapted to support the lower portion of the panel; a second clamping cylinder having an operating rod and having a lower end connected to (e.g. hinged or the like) to the first locator; a second clamper having a side connected to (e.g. hinged or the like) to an upper end of the first locator and a rear end hinged to the operating rod of the second clamping cylinder; and a second pusher mounted at a front end of the second clamper and being adapted to apply pressure to the upper portion of the panel supported on an upper portion of the first locator by rotation of the second clamper.

According to various embodiments, the first locator may include: a first locator body mounted at the first connecting plate; a first mounting block mounted at an upper portion of the first locator body; a first rotatable ball rotatably mounted at the mounting block; a first supporting pad connected to the first rotatable ball; and a first coil spring interposed between the first supporting pad and the first rotatable ball.

According to various embodiments, the first guider may be mounted at a position of the first locator body corresponding to the first supporting pad.

According to various embodiments, the second pusher may include: a second pusher rod slidably mounted upward and downward at the second clamper in a state of passing through a front end of the second clamper; a pressing block fixedly mounted at a lower end of the second pusher rod and being adapted to be in contact with the upper portion of the panel; and a second elastic member disposed between the second clamper and the pressing block so as to apply elastic force to the pressing block in contact with the panel.

According to various embodiments, the third vertically-movable means may be vertically mounted respectively at both end portions of a second connecting plate, wherein the second connecting plate is mounted at the second sliding plate of the second movable unit disposed at the rear portion of the base plate.

According to various embodiments, the third vertically-movable means may include: a third supporting post mounted vertically at the second connecting plate; a fifth rail housing mounted at the third supporting post and to which a fifth sliding plate is slidably coupled; a fifth drive motor mounted at a lower end of the fifth rail housing and having a rotational shaft connected to a fifth ball screw; a fifth guide rail mounted at the third supporting post in the fifth rail housing through a fifth plate; and a fifth rail block connected to the fifth sliding plate, and having an interior in which the fifth ball screw is insertable so as to be reciprocated along the fifth guide rail when the fifth ball screw is rotated by operation of the fifth drive motor.

According to various embodiments, a fifth brake may be mounted between the rotational shaft of the fifth drive motor and the fifth ball screw.

According to various embodiments, the third clamping unit may include: a second locator movably mounted upward and downward at the fifth sliding plate so as to support a lower rear portion of the panel; a third clamping cylinder having an operating rod and having a rear end connected to (e.g. hinged or the like) to the second locator; a third clamper having a side connected to (e.g. hinged or the like) to an upper end of the second locator and a rear end connected to (e.g. hinged or the like) to the operating rod of the third clamping cylinder; and a third pusher mounted at a front end of the third clamper and being adapted to apply pressure to the upper portion of the panel supported on an upper portion of the second locator by rotation of the third clamper.

According to various embodiments, the second locator may include: a second locator body mounted at the fifth sliding plate; a second mounting block mounted at an upper portion of the second locator body; a second rotatable ball rotatably mounted at the mounting block; a second supporting pad connected to the second rotatable ball; and a second coil spring interposed between the second supporting pad and the second rotatable ball.

According to various embodiments, a second guider may be mounted at a position of the second locator body corresponding to the second supporting pad.

According to various embodiments, the third pusher may include: a third pusher rod slidably mounted upward and downward at the third clamper in a state of passing through a front end of the third clamper; a pressing block fixedly mounted at a lower end of the third pusher rod and adapted to be in contact with the upper portion of the panel; and a third elastic member disposed between the third clamper and the pressing block so as to apply elastic force to the pressing block.

According to various embodiments, the apparatus for clamping the panel may further include a supporting unit for supporting a lower center portion of the panel between the first movable units.

According to various embodiments, the supporting unit may include: a fourth supporting post mounted on the base frame between the first movable units; an ascending/descending cylinder having an operating rod and being mounted at the fourth supporting post; and a supporting block mounted at an upper end of the operating rod of the ascending/descending cylinder and being adapted to support the lower center portion of the panel, such as during forward and backward operation of the ascending/descending cylinder.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

Figure 1:
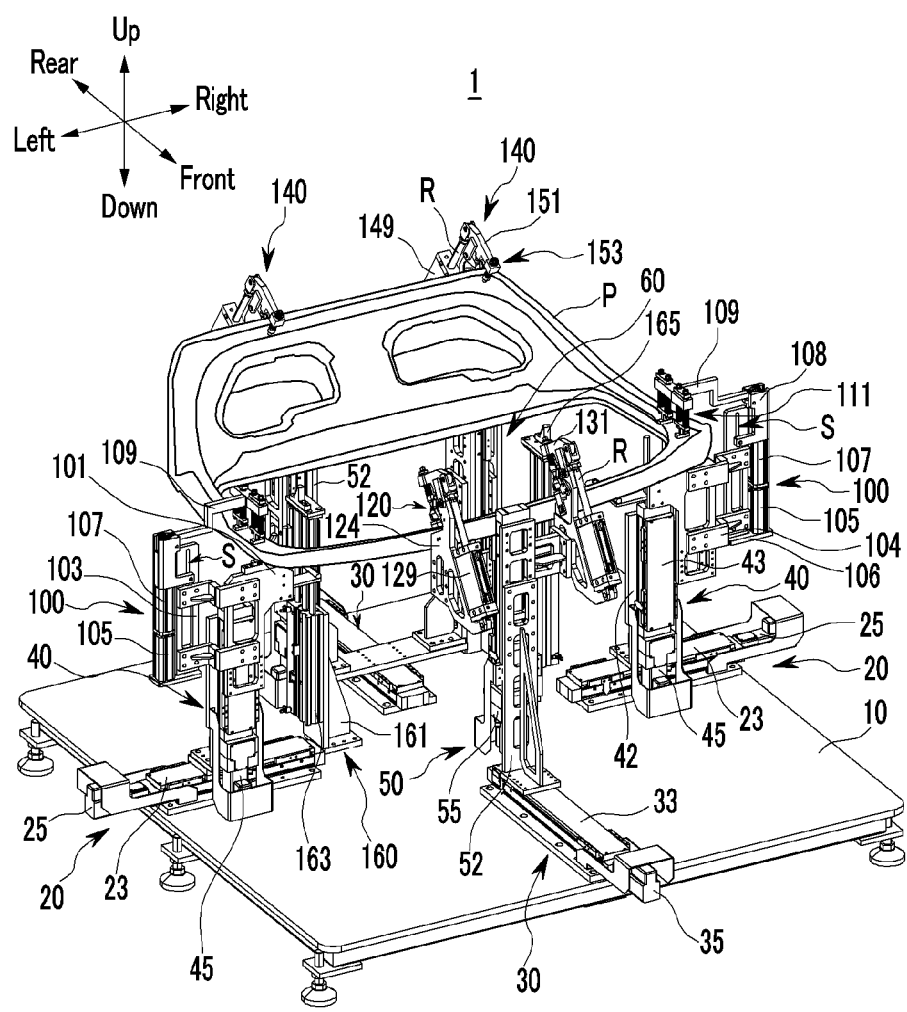
FIG. 1 and FIG. 2 are schematic diagrams showing an apparatus for clamping a panel for a vehicle according to an exemplary embodiment of the present invention, wherein a panel is provided in a settled state.

1: apparatus for clamping a panel
10: base frame
20, 30: first and second movable units, respectively
40, 50, 60: first, second, and third vertically-movable means, respectively
21, 31, 41, 51, 61: first, second, third, fourth, and fifth sliding plates, respectively
23, 33, 43, 53, 63: first, second, third, fourth, and fifth rail housings, respectively
24, 34, 44, 54, 64: first, second, third, fourth, and fifth brakes, respectively
25, 35, 45, 55, 65: first, second, third, fourth, and fifth drive motors, respectively
26, 36, 46, 56, 66: first, second, third, fourth, and fifth ball screws, respectively
27, 37, 47, 57, 67: first, second, third, fourth, and fifth guide rails, respectively
28, 38, 48, 58, 68: first, second, third, fourth, and fifth plates, respectively
29, 39, 49, 59, 69: first, second, third, fourth, and fifth rail blocks, respectively
42, 52, 62, 161: first, second, third, and fourth supporting posts, respectively
100, 120, 140: first, second, and third clamping units, respectively
101: first mounting frame
102: settling pad
103: connecting frame
104: connecting block
105: first operating cylinder
106: fixing block
107, 129, 149: first, second, and third clamping cylinders, respectively
108: first clamper body
109, 131, 151: first, second, and third clampers, respectively
111, 133, 153: first, second, and third pushers, respectively
113, 134, 154: first, second, and third pusher rods, respectively
115: pusher end
135, 155: pressing block
117, 136, 156: first, second, and third elastic members, respectively
121, 141: first and second connecting plates, respectively
122, 142: first and second guiders, respectively
123, 143: first and second locators, respectively
124, 144: first and second locator bodies, respectively
125, 145: first and second mounting blocks, respectively
126, 146: first and second rotatable balls, respectively
127, 147: first and second supporting pads, respectively
128, 148: first and second coil springs, respectively
160: supporting unit
163: ascending/descending cylinder
165: supporting block
P: panel
S: slot
R: operating rod

DETAILED DESCRIPTION OF THE EMBODIMENTS

An exemplary embodiment of the present invention will hereinafter be described in detail with reference to the accompanying drawings. The embodiments described in this specification and drawings are merely exemplary embodiments of the present invention. It is to be understood that there can be various modifications and equivalents included in the spirit of the present invention at the filing of this application.

Figure 2:
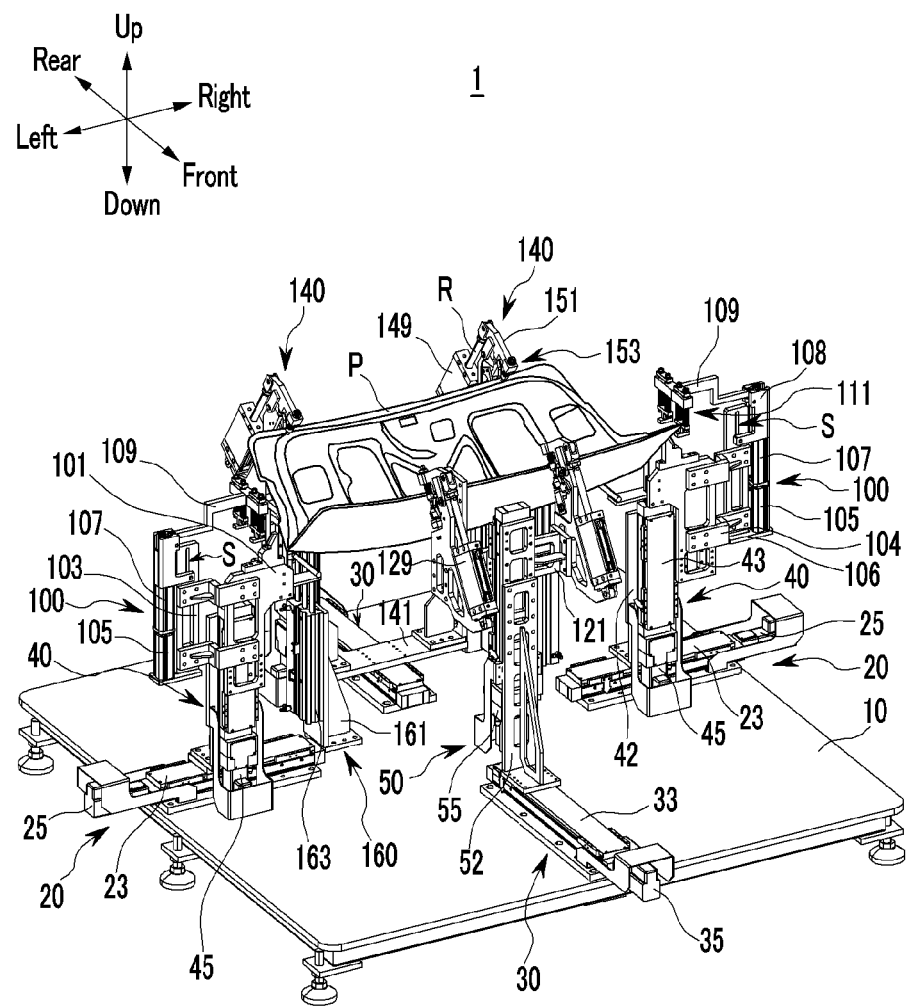
Figure 3:
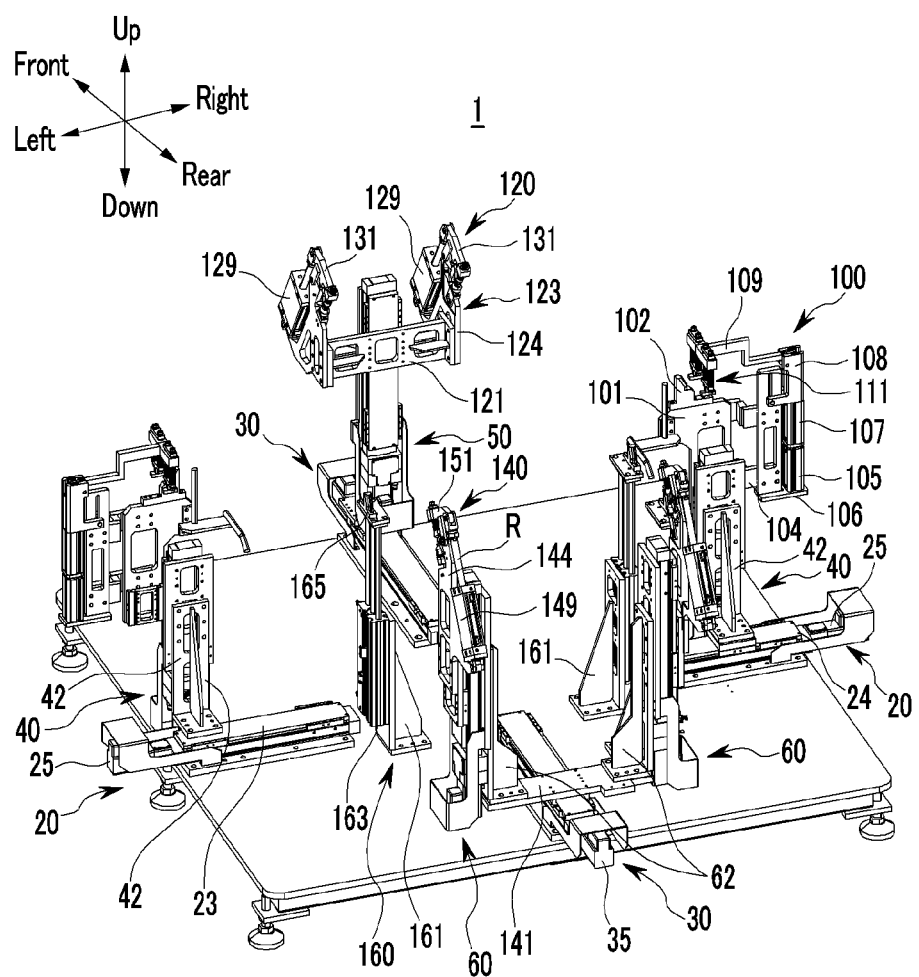
FIG. 3 is a perspective view of an apparatus for clamping a panel for a vehicle according to an exemplary embodiment of the present invention.

FIG. 1 and FIG. 2 are schematic diagrams an apparatus for clamping a panel for a vehicle according to an exemplary embodiment of the present invention, wherein a panel is shown in a settled state on the apparatus. FIG. 3 is a perspective view of an apparatus for clamping a panel for a vehicle according to an exemplary embodiment of the present invention.

Referring to the drawings, an apparatus 1 may be used in a vehicle body assembly line where welding and/or sealing is performed on a panel P. In particular the apparatus 1 is used to settle and fix the panel P on which pressing is performed. The panel P may be any panel of any variety of vehicle models, such as a tailgate panel or a trunk lid panel.

In particular, the apparatus 1 according to an exemplary embodiment of the present invention can be applied to a hood panel, such a tailgate or a trunk lid, which may have different shapes and sizes depending on the particular vehicle model. Therefore, a variety panels P, such as a variety of hood panels, can all be clamped using the present apparatus 1 regardless of the dimension and surface curvature of the panel P, and thus regardless of the vehicle model.

As shown in FIGS. 1-3, in an exemplary embodiments, the apparatus 1 includes a base frame 10, first and second movable units 20 and 30, first, second, and third vertically-movable means 40, 50, and 60, and first, second, and third clamping units 100, 120, and 140.

In particular, the base frame 10 may be mounted on a floor of a workshop, and the first and second movable units 20 and 30 may be mounted on an upper portion of the base frame 10 as shown.

In the exemplary embodiment show in FIGS. 1-3, the first movable units 20 are mounted respectively on left and right portions of an upper surface of the base frame 10, and they are configured and arranged to reciprocate the first sliding plates 21 on the base frame 10 between the left and the right portions.

Figure 4:
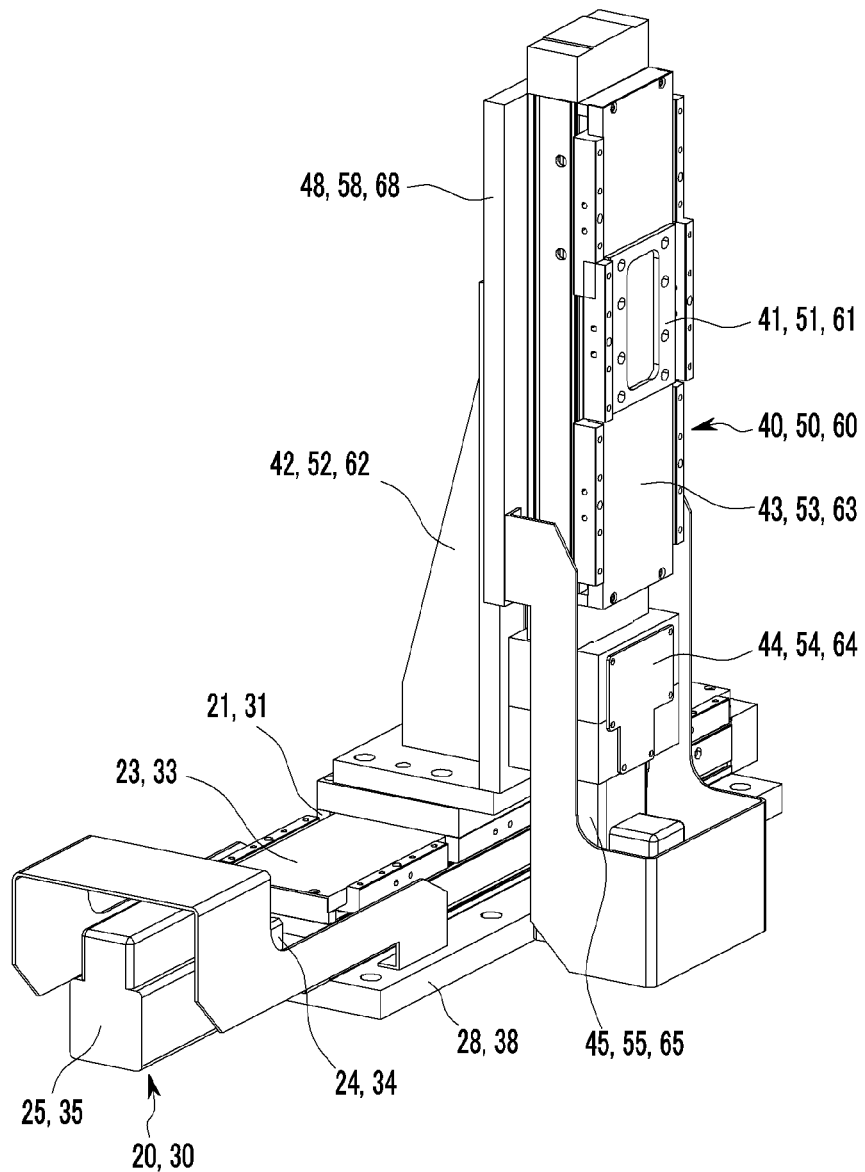
FIG. 4 is a schematic diagram showing a movable unit and vertically-movable means of an apparatus for clamping a panel for a vehicle according to an exemplary embodiment of the present invention.
Figure 5:
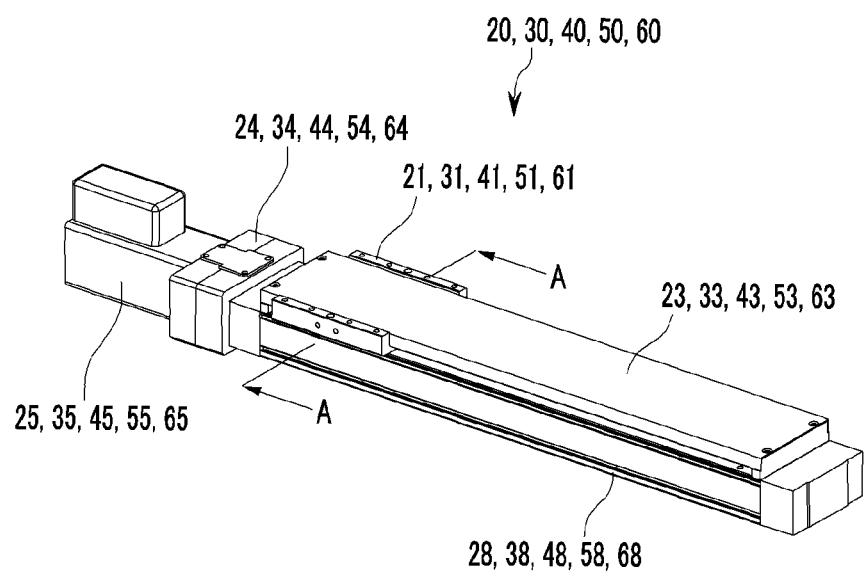
FIG. 5 is a perspective view of a movable unit and vertically-movable means of an apparatus for clamping a panel for a vehicle according to an exemplary embodiment of the present invention.
Figure 6:
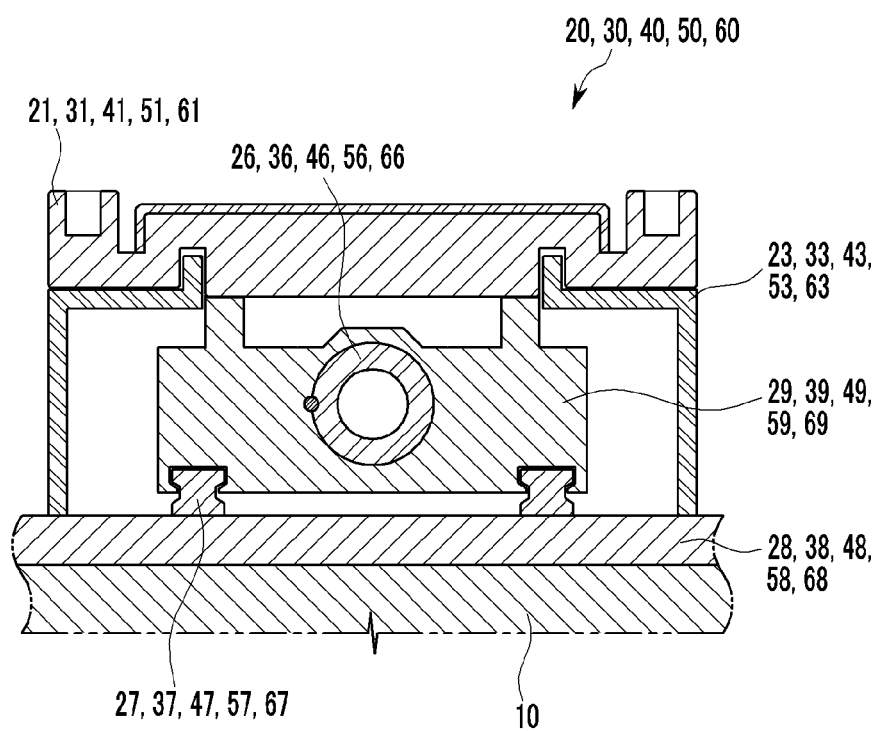
FIG. 6 is a cross-sectional view taken along the line A-A in FIG. 5.

FIG. 4 is a schematic diagram showing an assembled state of a movable unit and vertically-movable means according to an exemplary embodiment of the present invention, FIG. 5 is a perspective view of a movable unit and vertically-movable means according to an exemplary embodiment of the present invention, and FIG. 6 is a cross-sectional view taken along the line A-A in FIG. 5.

Herein, the first movable unit 20, as shown in FIG. 3 to FIG. 6, includes a first rail housing 23, a first drive motor 25, a first guide rail 27, and a first rail block 29.

As shown, the first rail housing 23 is mounted on the upper portion of the base frame 10 from the left to the right, and the first sliding plate 21 is slidably coupled to an upper portion of the first rail housing 23.

The first drive motor 25 is mounted on the upper portion of the base frame 10 at a side of the first rail housing 23, and has a rotational shaft connected to a first ball screw 26.

In this embodiment, a first brake 24 is mounted between the rotational shaft of the first drive motor 25 and the first ball screw 26. Thus, for example, if electric power is shut off or if a state of emergency occurs during operation of the first movable unit 20, the first brake 24 can prevent operation of the first sliding plate 21 by preventing torque of the first drive motor 25 from being delivered to the first ball screw 26.

In the present exemplary embodiment, the first guide rail 27 is mounted on the base frame 10 in the first rail housing 23 through a first plate 28.

In addition, the first ball screw 26 is inserted in the first rail block 29 such that the first rail block 29 moves along the first guide rail 27 when the first ball screw 26 is rotated by the first drive motor 25. The first rail block 29 is connected to the first sliding plate 21.

As such, if the first drive motor 25 rotates clockwise or counterclockwise, then the first rail block 29 of the first movable unit 20 is moved along the first guide rail 27 by the first ball screw 26. The first sliding plate 21, which is connected to the first rail block 29, is thus reciprocated on the base frame 10 between the left and the right.

In addition, the second movable units 30 are mounted respectively on front and rear portions of the base frame 10 between the first movable units 20. The second movable units 30 are adapted to reciprocate second sliding plates 31 on the base frame 10 between the front and the rear.

According to the exemplary embodiment, the shape, constituent elements, and operation of the second movable units 30 are the same as or similar to those of the first movable units 20. The second movable units 30 will be described in further detail referring to FIG. 3 to FIG. 6.

Referring to the drawings, the second movable unit 30 includes a second rail housing 33, a second drive motor 35, a second guide rail 37, and a second rail block 39.

The second rail housing 33 is mounted on the upper portion of the base frame 10 extending from the front to the rear, and the second sliding plate 31 is slidably coupled to an upper portion of the second rail housing 33.

The second drive motor 35 is mounted on the upper portion of the base frame 10 at a side of the second rail housing 33, and has a rotational shaft connected to a second ball screw 36.

As shown, a second brake 34 is mounted between the rotational shaft of the second drive motor 35 and the second ball screw 36. Thus, for example, if electric power is shut off or a state of emergency occurs during operation of the second movable unit 30, the second brake 34 (like the first brake 24) can prevent operation of the second sliding plate 31 by preventing torque of the second drive motor 35 from being delivered to the second ball screw 36.

In the present exemplary embodiment, the second guide rail 37 is mounted on the base frame 10 in the second rail housing 33 through a second plate 38.

In addition, the second ball screw 36 is inserted in the second rail block 39 such that rotation of the second ball screw 36 causes the second rail block 39 to move along the second guide rail 37.

According to the exemplary embodiment, the second rail block 39 is connected to the second sliding plate 31. As such, if the second drive motor 35 rotates clockwise or counterclockwise, the second rail block 39 of the second movable unit 30 is moved along the second guide rail 37 by the second ball screw 36 to reciprocate on the base frame 10 between the front and the rear.

In the present exemplary embodiment, the first vertically-movable means 40 are adapted to move the first clamping unit 100, which is movably mounted on the base frame 10 through the first movable unit 20, upward and downward with respect to the base frame 10.

According to the exemplary embodiment, the shape, constituent elements, and operation of the first vertically-movable means 40 are the same as or similar to those of the first and the second movable units 20 and 30. The first vertically-movable means 40 will be described in further detail referring to FIG. 4 to FIG. 6.

Referring to the drawings, according to an exemplary embodiment the first vertically-movable means 40 include a first supporting post 42, a third rail housing 43, a third drive motor 45, a third guide rail 47, and a third rail block 49.

As shown, the first supporting post 42 is mounted at a side of an upper portion of the first sliding plate 21.

In the exemplary embodiment, the third rail housing 43 is mounted at a side surface of the first supporting post 42, and a third sliding plate 41 is slidaly coupled to the third rail housing 43.

The third drive motor 45 is mounted at a lower end of the third rail housing 43 and has a rotational shaft connected to a third ball screw 46.

As shown, a third brake 44 is mounted between the rotational shaft of the third drive motor 45 and the third ball screw 46. As such, if electric power is shut off or a state of emergency occurs during operation of the apparatus 1, the third brake 44 can prevent operation of the first vertically-movable means 40. The structure and function of the third brake 44 can be the same as or similar to those of the first and second brakes 24 and 34, and, thus, a detailed description of the third brake 44 will be omitted.

In the present exemplary embodiment, the third guide rail 47 is mounted on the first supporting post 42 in the third rail housing 43 through a third plate 48.

In addition, the third ball screw 46 is inserted in the third rail block 49 such that the third rail block 49 moves along the third guide rail 47 when the third ball screw 46 is rotated by the third drive motor 45.

Figure 7:
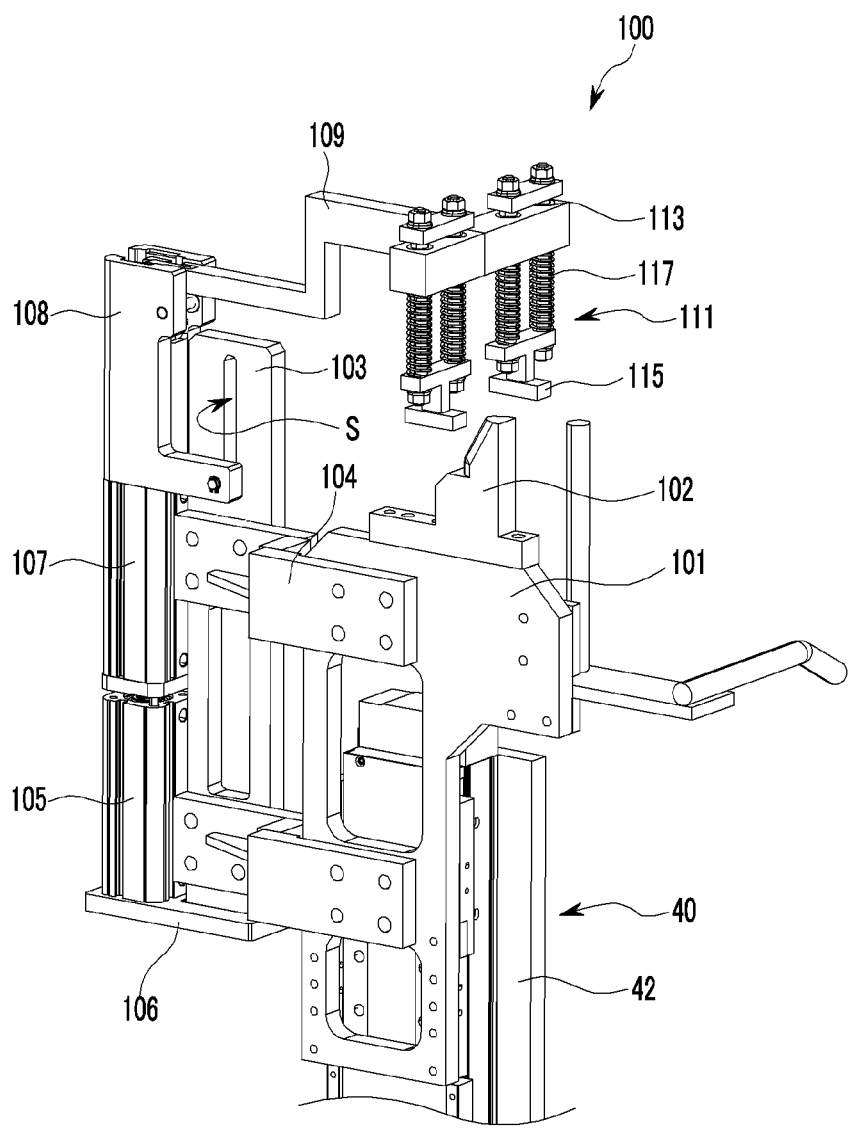
FIG. 7 is a perspective view of a first clamping unit of an apparatus for clamping a panel for a vehicle according to an exemplary embodiment of the present invention.

According to the exemplary embodiment, the third rail block 49 is connected to the third sliding plate 41. As such, if the third drive motor 45 mounted at the first supporting post 42 rotates clockwise or counterclockwise, then the third rail block 49 of the first vertically-movable means 40 is moved along the third guide rail 47 by the third ball screw 46. Motion of the third rail block 49 causes the third sliding plate 41, which is connected to the third rail block 49, to reciprocate on the base frame 10 upward and downward. FIG. 7 is a perspective view of a first clamping unit which may be provided in an apparatus 1 according to an exemplary embodiment of the present invention.

Referring to the drawings, the first clamping units 100 are movable between the left and the right on the base frame 10 through the first sliding plate 21, and are further movable upward and downward through the first vertically-movable means 40. Thus, the first clamping units 100 can clamp both sides of a panel P which has been settled on upper portions of the first clamping units 100.

The first clamping unit 100, as shown in FIG. 7, includes a first mounting frame 101, a connecting frame 103, a first operating cylinder 105, a first clamping cylinder 107, a first clamper 109, and a first pusher 111.

The first mounting frame 101 is mounted at the third sliding plate 41 of the first vertically-movable means 40.

Figure 8:
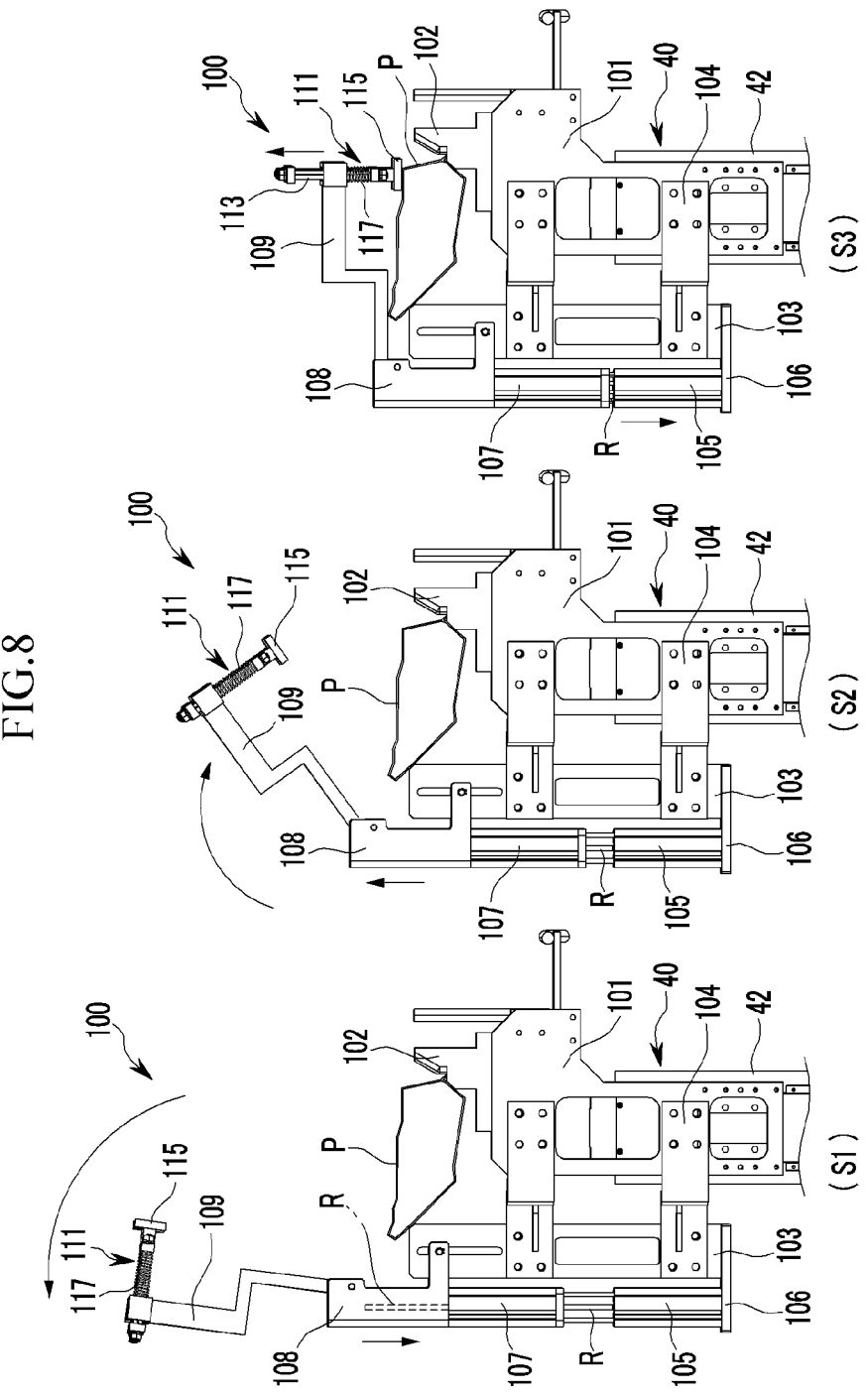
FIG. 8 is a schematic diagram showing operation of the first clamping unit of an apparatus of clamping a panel for a vehicle according to an exemplary embodiment of the present invention.

Further, a settling pad 102 may be mounted on an upper end of the first mounting frame 101. A lower portion of the panel P may be mounted on the settling pad 102, for example as shown in FIG. 8. If the upper portion of the panel P is pressed by the first clamper 109 and the first pusher 111, the settling pad 102 can stably support the lower portion of the panel P and can prevent breakage of the panel P. According to various embodiments, the settling pad 102 is made of rubber material.

In the present exemplary embodiment, the connecting frame 103 is connected to the first mounting frame 101 through a connecting block 104. As shown, a slot S may be formed at an upper portion of the connecting frame 103 in a length direction thereof.

The first operating cylinder 105 includes an operating rod R, and has a lower end fixedly mounted at a side of a lower portion of the connecting frame 103 through a fixing block 106.

In the present exemplary embodiment, the first clamping cylinder 107 includes an operating rod R, and has a lower end connected to an upper end of the operating rod R of the first operating cylinder 105.

A side of a lower portion of the first clamper body 108, which is mounted at an upper portion of the first clamping cylinder 107, may be connected to the slot S of the connecting frame 103 such that the first clamper body 108 is movably mounted at the connecting frame 103 by forward and backward operation of the first operating cylinder 105.

In addition, a side of the first clamper 109 is connected, such as by hinges, to the upper portion of the first clamper body 108 and a rear end of the first clamper 109 is connected, such as by hinges, to the operating rod R of the first clamping cylinder 107.

Thus, the first clamper 109 can be rotated upward and downward with respect to the first clamper body 108 by forward and backward operation of the first clamping cylinder 107.

In the present exemplary embodiment, the first pushers 111 are mounted respectively at both sides of a front end of the first clamper 109 and are configured and arranged so as to press the upper portion of the panel P.

In particular, the first pusher 111 includes a first pusher rod 113, a pusher end 115, and a first elastic member 117. The first pusher rod 113 is disposed at the front end of the first clamper 109 and is slidably mounted upward and downward at the first clamper 109 when the first pusher rod 113 passes through the first clamper 109.

The pusher end 115 is fixedly mounted at a lower end of the first pusher rod 113 and is adapted to be in contact with the upper portion of the panel P.

The pusher end 115 may be made of a rubber material or other similar materials so as to prevent breakage and damage of the panel P.

In addition, the first elastic member 117 is disposed between the first clamper 109 and the pusher end 115 so as to exert elastic force on the pusher end 115 in contact with the panel P.

When the first pusher rod 113 is insert in the first elastic member 11, one end of the first elastic member 117 can be supported by the first clamper 109, and the other end of the first elastic member 117 can be supported by the pusher end 115. According to the exemplary embodiment, the first elastic member 117 is a coil spring. It is noted that any reference to elastic members and coil springs can also encompass other suitable structures that provide similar properties (e.g. elasticity, tension and strength) as that provided by a coil spring.

Operation of the first clamping unit 100 will be described in detail referring to FIG. 8.

When the panel P is transferred by a robot or a worker and is positioned on the upper portion of the first mounting frame 101 as shown in (S1) of FIG. 8, the settling pad 102 supports the lower portion of the panel P and settlement of the panel P is completed (the panel P is considered "settled").

According to the exemplary embodiment, the operating rod R of the first clamping cylinder 107 moves backward and rotates the clamper 109 upward so as to prevent interference between the panel P and the first clamper 109 when the panel P is transferred and settled.

Simultaneously, the operating rod R of the first operating cylinder 105 moves forward so as to move the first clamping cylinder 107 upward on the connecting frame 103 along the slot S.

If settlement of the panel P is completed at this state, the operating rod R of the first clamping cylinder 107 moves forward so as to rotate the first clamper 109 downward as shown in (S2) of FIG. 8. Then, the pusher end 115 of the first pusher 111 comes into contact with the upper portion of the panel P.

If the pusher end 115 and the panel P are in contact, the operating rod R of the first operating cylinder 105 moves backward so as to move the first clamping cylinder 107 downward on the connecting frame 103 along the slot S. The first clamper 109, as shown in (S3) of FIG. 8, then moves downward along the first pusher rod 113 and compresses the first elastic member 117. Therefore, the pusher end 115 presses the upper portion of the panel P by elastic force of the first elastic member 117 in a state that the pusher end 115 contacts the upper portion of the panel P, and clamping of the panel P is completed.

In the present exemplary embodiment, the second vertically-movable means 50 are movably mounted between the front and the rear on the base frame 10. In particular, the second vertically-movable means 50 are movably mounted through the second movable unit 30 disposed on the front portion of the base frame 10, and are adapted to move the second clamping unit 120. Thus, for example, the second vertically-movable means 50 may move the second clamping unit 120 upwardly or downwardly with respect to the base frame 10 so that the second clamping unit 120 may clamp both sides of the front portion of the panel P.

The shape, constituent elements, and operation of the second vertically-movable means 50 are similar to or the same as those of the first and second movable units 20 and 30 and the first vertically-movable means 40. The second vertically-movable means 50 will be described in detail referring to FIG. 3 to FIG. 6.

Referring to the drawings, the second vertically-movable means 50 include a second supporting post 52, a fourth rail housing 53, a fourth drive motor 55, a fourth guide rail 57, and a fourth rail block 59.

The second supporting post 52 is mounted at a side of an upper portion of the second sliding plate 31.

In the present exemplary embodiment, the fourth rail housing 53 is mounted at a side surface of the second supporting post 52, and a fourth sliding plate 51 is slidably coupled to the fourth rail housing 53.

The fourth drive motor 55 is mounted at a lower end of the fourth rail housing 53 and has a rotational shaft connected to a fourth ball screw 56. According to this embodiment, a fourth brake 54 is mounted between the rotational shaft of the fourth drive motor 55 and the fourth ball screw 56. Thus, for example, if electric power is shut off or a state of emergency occurs during operation of the apparatus 1 of clamping the panel, then the fourth brake 54 can prevent operation of the second vertically-movable means 50. The structure and function of the fourth brake 54 can be the same as or similar to those of the first, second, and third brakes 24, 34, and 44, and, thus, a detailed description thereof will be omitted.

In the present exemplary embodiment, the fourth guide rail 57 is mounted on the second supporting post 52 in the fourth rail housing 53 through a fourth plate 58.

In addition, the fourth ball screw 56 is inserted in the fourth rail block 59 such that the fourth rail block 59 moves along the fourth guide rail 57 when the fourth ball screw 56 is rotated by the fourth drive motor 55.

According to the exemplary embodiment, the fourth rail block 59 is connected to the fourth sliding plate 51. As such, if the fourth drive motor 55 mounted at the second supporting post 52 rotates clockwise or counterclockwise, then the fourth rail block 59 of the second vertically-movable means 50 is moved along the fourth guide rail 57 by the fourth ball screw 56.

This causes the fourth sliding plate 51 connected to the fourth rail block 59 to reciprocated with respect to the base frame 10 upward and downward.

As shown, the second clamping unit 120 is mounted at the second vertically-movable means 50. The second clamping unit 120 will be described hereafter in detail in connection with an exemplary embodiment depicted in FIG. 9.

Referring to the drawing, the second clamping unit 120 is movable between the front and the rear on the base frame 10 through the second sliding plate 31, and is further movable upward and downward through the second vertically-movable means 50. As such, the second clamping unit 12 can be suitable positioned to clamp both sides of the front portion of the panel P.

Figure 9:
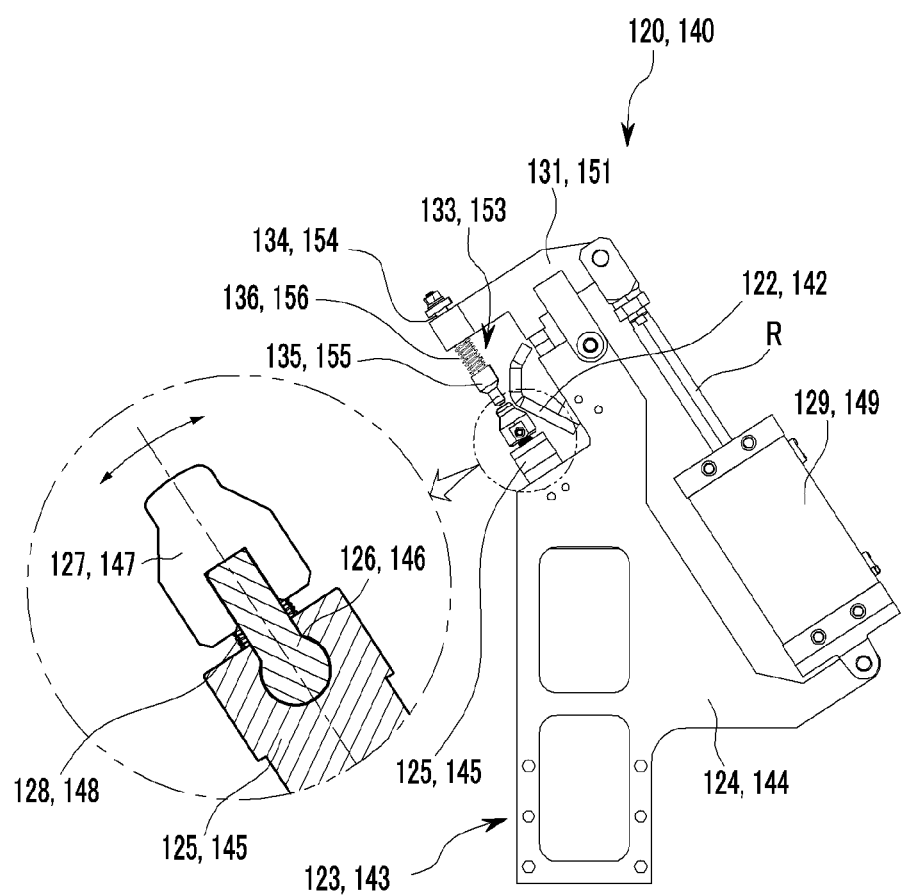
FIG. 9 is a side view of the second and third clamping units of an apparatus for clamping a panel for a vehicle according to an exemplary embodiment of the present invention.

The second clamping unit 120, as shown in FIG. 9, includes a first connecting plate 121 (referring to FIG. 3), a first locator 123, a second clamping cylinder 129, a second clamper 131, and a second pusher 133.

In particular, the first connecting plate 121 is mounted at the fourth sliding plate 51 of the second vertically-movable means 50 and is movable upwardly and downward with respect to the base frame 10 by operation of the second vertically-movable means 50.

The first locators 123 are mounted at both ends of the first connecting plate 121. The first locators 123 are adapted to support the front lower portion of the panel P, and include a first locator body 124, a first mounting block 125, a first rotatable ball 126, a first supporting pad 127, and a first coil spring 128.

According to this embodiment, the first locator bodies 124 are fixedly mounted at both ends of the first connecting plate 121. Further, the first mounting block 125 may be mounted at an upper portion of the first locator body 124, the first rotatable ball 126 may be rotatably mounted at the first mounting block 125, and the first supporting pad 127 may be connected to the first rotatable ball 126.

As shown, the first coil spring 128 is interposed between the first supporting pad 127 and the first rotatable ball 126. The first coil spring 128 is adapted to exert elastic force on the first supporting pad 127.

In addition, a first guider 122 can be mounted at a position of the first locator body 124 corresponding to the first supporting pad 127.

The first guider 122 is configured and arranged to prevent a front end of the panel P from directly contacting the first locator body 124, and to guide the panel P so that it is supported stably by an upper portion of the first supporting pad 127.

In particular, by rotatably connecting the first supporting pad 127 to the first mounting block 125, the first locator 123 can support the panel P stably even if the panel P has a slanted portion or a curved portion.

If the panel P is not settled on the first supporting pad 127, the first supporting pad 127 is returned to its original position by elastic force of the first coil spring 128.

In the present exemplary embodiment, the second clamping cylinder 129 has an operating rod R, and is hinged to the first locator 123 at an opposite side of the first supporting pad 127.

Further, a side of the second clamper 131 is hinged to an upper portion of the first locator 123, and a rear end of the second clamper 131 is hinged to the operating rod R of the second clamping cylinder 129. In addition, the second pusher 133 is mounted at a front end of the second clamper 131 such that it can press the upper portion of the panel P supported on the upper portion of the first locator 123 by rotation of the second clamper 131. In particular, the second pusher 133 can include a second pusher rod 134, a pressing block 135, and a second elastic member 136. The second pusher rod 134 is slidably mounted such that it can move upward and downward at the second clamper 131 when it passes through a front end of the second clamper 131.

In the present exemplary embodiment, a pressing block 135 is fixedly mounted at a lower end of the second pusher rod 134, and is adapted to be in contact with the upper portion of the panel P.

In addition, the second elastic member 136 is disposed between the second clamper 131 and the pressing block 135 so as to exert an elastic force on the pressing block 135 which is in contact with the panel P.

In particular, when the second pusher rod 134 is inserted in the second elastic member 136, one end of the second elastic member 136 can be supported by the second clamper 131, and the other end of the second elastic member 136 can be supported by the pressing block 135. The second elastic member 136 may be, for example, a coil spring.

In the present exemplary embodiment, the third vertically-movable means 60 are movably mounted extending between the front and the rear of the base frame 10 through the second movable unit 30, which is disposed on the rear portion of the base frame 10. The third vertically-movable means 60 are adapted to move the third clamping unit 140 upward and downward with respect to the base frame 10 so that the third clamping unit 140 may be suitably positioned for clamping both sides of the rear portion of the panel P.

The third vertically-movable means 60, as shown in FIG. 3, may be mounted vertically at both side portions of a second connecting plate 141, which is mounted at the second sliding plate 31 of the second movable unit 30 and is disposed on the rear portion of the base plate 10.

The second connecting plate 141 can be fixedly mounted at the second sliding plate 31 so as to move together with the second sliding plate 31.

The shape, constituent elements, and operation of the third vertically-movable means 60 are similar to or the same as those of the first and second movable units 20 and 30 and the first and second vertically-movable means 40 and 50. The third vertically-movable means 60 will be described in further detail referring to FIG. 4 to FIG. 6.

Referring to the drawings, the third vertically-movable means 60 according to an exemplary embodiment of the present invention include a third supporting post 62, a fifth rail housing 63, a fifth drive motor 65, a fifth guide rail 67, and a fifth rail block 69.

As shown, the third supporting posts 62 are mounted vertically at both end portions of the second connecting plate 141.

In the present exemplary embodiment, the fifth rail housing 63 is mounted at a side surface of the third supporting post 62, and a fifth sliding plate 61 is slidably coupled to the fifth rail housing 63.

The fifth drive motor 65 is mounted at a lower end of the fifth rail housing 63, and has a rotational shaft connected to a fifth ball screw 66.

As shown, a fifth brake 64 can be mounted between the rotational shaft of the fifth drive motor 65 and the fifth ball screw 66. As such, if electric power is shut off or a state of emergency occurs during operation of the apparatus 1 of clamping the panel, the fifth brake 64 can prevent operation of the third vertically-movable means 60. The structure and function of the fifth brake 64 are the same or similar to as those of the first, second, third, and fourth brakes 24, 34, 44, and 54, and thus, a detailed description thereof will be omitted.

In the present exemplary embodiment, the fifth guide rail 67 is mounted on the third supporting post 62 in the fifth rail housing 63 through a fifth plate 68.

In addition, the fifth ball screw 66 is inserted in the fifth rail block 59 such that the fifth rail block 59 moves along the fifth guide rail 67 when the fifth ball screw 66 is rotated by the fifth drive motor 65.

Further, the fifth rail block 59 is connected to the fifth sliding plate 61 such that, if the fifth drive motor 65 rotates clockwise or counterclockwise, the fifth rail block 69 moves along the fifth guide rail 67 by the fifth ball screw 66. This causes the fifth sliding plate 61 connected to the fifth rail block 69 to reciprocate with respect to the base frame 10 upward and downward.

Further, the third clamping unit 140 is mounted at the third vertically-movable means 60. The third clamping unit 140 will be described in detail referring to FIG. 9. Referring to the drawing, the third clamping unit 140 is movable between the front and the rear on the base frame 10 through the second sliding plate 31 of the second movable unit 30, and is further movable upward and downward through the third vertically-movable means 60. As such, the third clamping unit 140 can be suitably arranged to clamp both sides of the rear portion of the panel P.

The third clamping unit 140, as shown in FIG. 9, includes a second locator 143, a third clamping cylinder 149, a third clamper 151, and a third pusher 153*l*.

The second locator 143 is adapted to support a lower rear portion of the panel P. The second locator 143 is mounted at the fifth sliding plate 61 so as to be movable upward and downward.

As shown, the second locator 143 includes a second locator body 144, a second mounting block 145, a second rotatable ball 146, a second supporting pad 147. and a second coil spring 148.

The second locator body 144 is fixedly mounted at the fifth sliding plate 61. Further, in the present exemplary embodiment, the second mounting block 145 is mounted at an upper portion of the second locator body 144. The second rotatable ball 146 is rotatably mounted at the second mounting block 145, and the second supporting pad 147 is connected to the second rotatable ball 146.

Herein, the second coil spring 148 is interposed between the second supporting pad 147 and the second rotatable ball 146 so as to exert elastic force on the second supporting pad 147.

In addition, a second guider 142 is mounted at a position of the second locator body 144 corresponding to the second supporting pad 147. The second guider 142 is configured and arranged to prevent a rear end of the panel P from directly coming into contact with the second locator body 143, and guides the panel P so that the panel P is supported stably by an upper portion of the second supporting pad 147.

In particular, since the second supporting pad 147 is rotatably connected to the second mounting block 145, the second locator 143 can support the panel P stably even if the panel P has a slanted portion or a curved portion.

If the panel P is not settled on the second supporting pad 147, the second supporting pad 147 is returned to its original position by elastic force of the second coil spring 148.

In the present exemplary embodiment, the third clamping cylinder 149 has an operating rod R and is hinged to the second locator 143 at an opposite side of the second supporting pad 147.

A side of the third clamper 151 is hinged to an upper end of the second locator 143, and a rear end of the third clamper 151 is hinged to the operating rod R of the third clamping cylinder 149.

In addition, the third pusher 153 is mounted at a front end of the third clamper 151 so as to press the upper portion of the panel P supported on the upper portion of the second locator 143 by rotation of the third clamper 151.

The third pusher 153 can include a third pusher rod 154, a pressing block 155, and a third elastic member 156.

The third pusher rod 154 is slidably mounted upward and downward at the third clamper 151 when it passes through a front end of the third clamper 151.

In the present exemplary embodiment, the pressing block 155 is fixedly mounted at a lower end of the third pusher rod 154, and is adapted to be in contact with the upper portion of the panel P.

In addition, the third elastic member 156 is disposed between the third clamper 151 and the pressing block 155 so as to exert elastic force on the pressing block 155 in contact with the panel P.

In particular, when the third pusher rod 154 is inserted in the third elastic member 156, one end of the third elastic member 156 is supported by the third clamper 151 and the other end of the third elastic member 156 is supported by the pressing block 155. The third elastic member 156 may be a coil spring or the like.

Operation of the second clamping unit 120 and the third clamping unit 140 will be described in further detail referring to FIG. 10.

Figure 10:
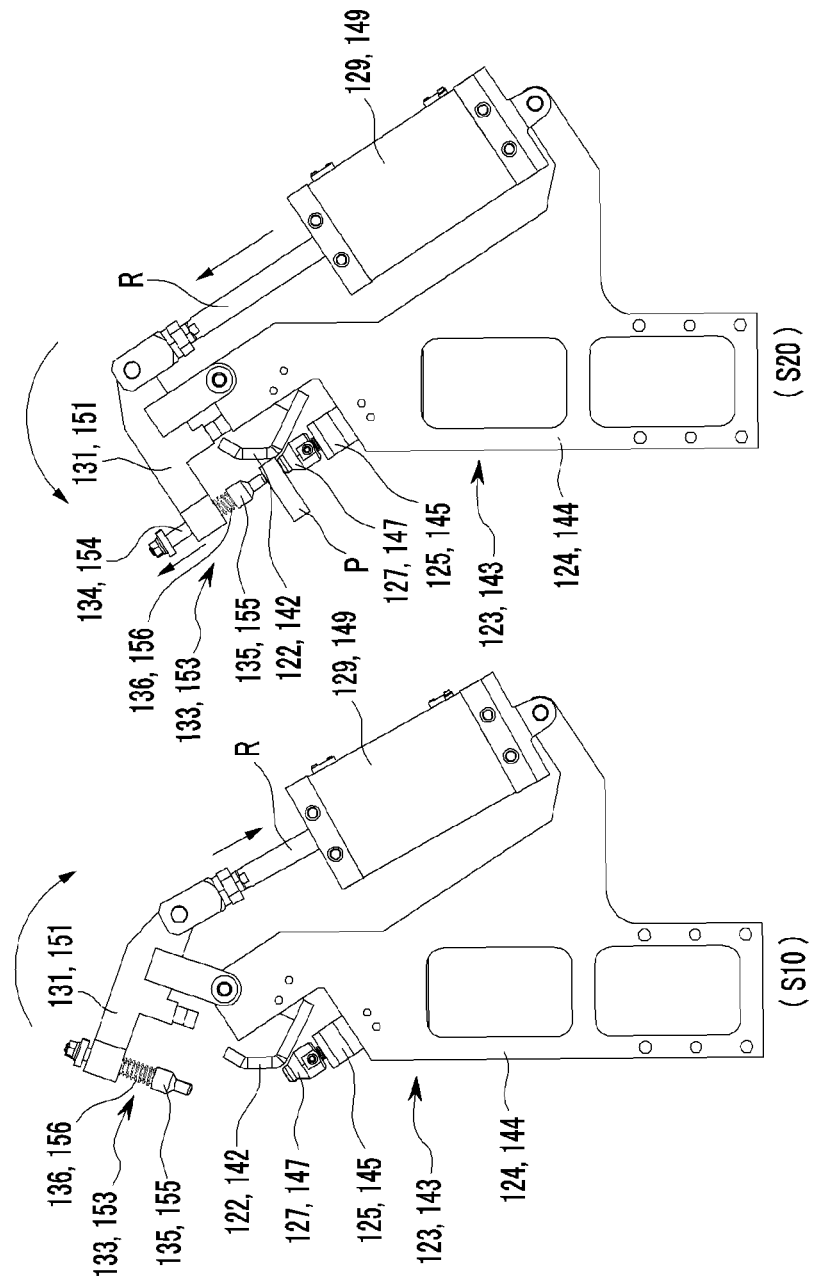
FIG. 10 is a schematic diagram showing operation of the second and third clamping units of an apparatus for clamping a panel for a vehicle according to an exemplary embodiment of the present invention.

Referring to the drawing, the second and third clamping cylinders 129 and 149 move backward so as to rotate the second and third clampers 131 and 151 upward as shown in (S10) of FIG. 10, before the panel P is transferred and settled on the first or the second locator 123 or 143 by a robot or a worker.

If the panel P is settled on the first and second locators 123 and 143 in this state, the first and second supporting pads 127 and 147 are rotated by the first and second rotatable balls 126 and 146 corresponding to a shape and a curvature of the front and rear portions of the lower portion of the panel P. Therefore, the panel P can be stably supported.

At this time, the first and second guiders 122 and 142 prevent the front and rear end portions of the panel P from coming into contact with the first and second locator bodies 124 and 144 and from being damaged, and further guide the panel P to be settled on the upper portions of the first and second supporting pads 127 and 147.

If settlement of the panel P is completed, the operating rods R of the second and third clamping cylinders 129 and 149 move forward so as to rotate the second and third clampers 131 and 151 downward.

Then, the pressing blocks 135 and 155 of the second and third pushers 133 and 153 contact the upper portion of the panel P.

If the operating rods R of the second and third clamping cylinders 129 and 149 further move forward as shown in (S20) of FIG. 10, then the second and third clampers 131 and 151 slide downward along the second and third pusher rods 134 and 154 and compress the second and third elastic members 136 and 156.

Therefore, when each of the pressing blocks 135 and 155 contact the upper portion of the panel P, they presses the upper front end rear portions of the panel P stably by elastic force of the second and third elastic members 136 and 156 so as to clamp the panel P.

In particular, the second and third clamping units 120 and 140 can support the lower portions of the panel P through the first and second supporting pads 127 and 147 of the first and second locators 123 and 143.

In addition, the second and third pusher 133 and 153 can apply clamping force to the panel P stably regardless of a position and a curved shape of the panel P. This can be done through the second and third elastic members 136 and 156 which are adapted to apply elastic force to the second and third pusher rods 134 and 154, and the pressing blocks 135 and 155 which slide through the second and third clampers 131 and 151.

Meanwhile, the apparatus 1 of clamping the panel for the vehicle according to the present exemplary embodiment further includes a supporting unit 160 that supports a lower center portion of the panel P between the first movable units 20.

Figure 11:
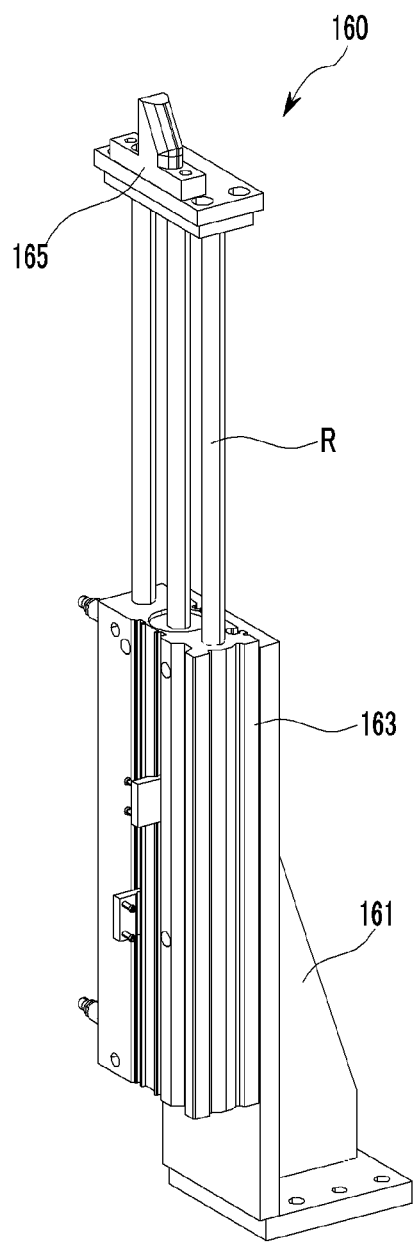
FIG. 11 is a perspective view of a supporting unit of an apparatus for clamping a panel for a vehicle according to an exemplary embodiment of the present invention.

FIG. 11 is a perspective view of a supporting unit applied to an apparatus of clamping a panel for a vehicle according to an exemplary embodiment of the present invention.

Referring to the drawing, the supporting unit 160 includes a fourth supporting post 161, an ascending/descending cylinder 163, and a supporting block 165.

As shown, the fourth supporting posts 161 are disposed on the base frame 10 between the first movable units 20 spaced apart from each other.

In the present exemplary embodiment, the ascending/descending cylinder 163 has an operating rod R, and is mounted at the fourth supporting post 161.

In addition, the supporting block 165 is mounted at an upper end of the operating rod R of the ascending/descending cylinder 163 and is adapted to support the lower center portion of the panel P by forward and backward operation of the ascending/descending cylinder 163.

The supporting block 165 may be made of rubber material or other materials that can prevent damage or breakage of the panel P when contacting the panel P.

Thus, the supporting block 165, which moves upward and downward by forward and backward operation of the ascending/descending cylinder 163. can support the lower portion of a panel P stably settled on the first, second and the third clamping units 100, 120, and 140.

Therefore, the panel P does not move and is settled stably during a clamping operation of the first, second and the third clamping units 100, 120, and 140.

The present apparatus 1 can, thus, stably clamp a panel P regardless of the dimension and surface curvature of the panel P. Thus, the present apparatus can be conveniently used to clamp various panels, which can be from different vehicle models, even if the panels have different shapes and sizes.

In addition, since the apparatus 1 can be used for the panels P of various vehicle models, the initial investment may be reduced and the structure of entire apparatus may be simplified.

In addition, the panels P having various shapes can be stably clamped by applying the first, second, and third pushers 111, 133, and 153 to the first, second and the third clamping units 100, 120, and 140. Since the first and second supporting pads 127 and 147 of the first and second locators 123 and 143 are rotatably mounted through the first and second rotatable balls 126 and 146, the panel P can be stably supported even if the panel P has a slanted portion or a curved portion.

It is understood that when explaining the apparatus 1 according to the exemplary embodiment of the present invention, the left, the right, the front, the rear, the up, and the down are defined with respect to the drawings. However, the apparatus is not limited to these specific definitions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for clamping a panel for a vehicle, comprising:
   a base frame;
   first movable units mounted on left and right portions of the base frame and adapted to reciprocate first sliding plates on the base frame between left and right positions;
   second movable units mounted on front and rear portions of the base frame between the first movable units, and adapted to reciprocate second sliding plates on the base frame between front and the rear positions;
   first clamping units being movable between the left and the right portions on the base frame through the first sliding plates, and being movable upward or downward through first vertically-movable means, and being configured and arranged to clamp both sides of a panel settled on upper portions of the first clamping units;
   a second clamping unit being movable between the front and the rear portions of the base frame through the second sliding plate, and being movable upward and downward through second vertically-movable means, and being configured and arranged to clamp a front side of the panel; and
   a third clamping unit being movable between the front and the rear portions of the base frame through the second sliding plate of the second movable unit disposed on the rear portion of the base frame, and being movable upward and downward through third vertically-movable means, and being configured and arranged to clamp a rear side of the panel.

2. The apparatus of claim 1, wherein the first movable unit comprises:
   a first rail housing mounted on the base frame extending from left to right, and having an upper portion to which a first sliding plate is slidably coupled;
   a first drive motor mounted on the base frame at a side of the first rail housing, and having a rotational shaft connected to a first ball screw;
   a first guide rail mounted in the first rail housing through a first plate; and
   a first rail block having an interior in which the first ball screw is inserted so as to be reciprocated along the first guide rail when the first ball screw is rotated by the first drive motor, and connected to the first sliding plate.

3. The apparatus of claim 2, wherein a first brake is mounted between the rotational shaft of the first drive motor and the first ball screw.

4. The apparatus of claim 1, wherein the second movable unit comprises:
   a second rail housing mounted on the base frame extending from front to the rear, and having an upper portion to which a second sliding plate is slidably coupled;
   a second drive motor mounted on the base frame at a side of the second rail housing, and having a rotational shaft connected to a second ball screw;
   a second guide rail mounted in the second rail housing through a second plate; and
   a second rail block connected to the second sliding plat, the second rail block having an interior in which the second ball screw is inserted so as to be reciprocated along the second guide rail when the second ball screw is rotated by the second drive motor.

5. The apparatus of claim 4, wherein a second brake is mounted between the rotational shaft of the second drive motor and the second ball screw.

6. The apparatus of claim 1, wherein the first vertically-movable means comprise:
   a first supporting post mounted on an upper portion of the first sliding plate;
   a third rail housing mounted at the first supporting post and to which a third sliding plate is slidably coupled;
   a third drive motor mounted at a lower end of the third rail housing and having a rotational shaft connected to a third ball screw;
   a third guide rail mounted at the first supporting post in the third rail housing through a third plate; and
   a third rail block connected to the third sliding plate, the third rail block having an interior in which the third ball screw is inserted so as to be reciprocated along the third guide rail when the third ball screw is rotated by the third drive motor.

7. The apparatus of claim 6, wherein a third brake is mounted between the rotational shaft of the third drive motor and the third ball screw.

8. The apparatus of claim 6, wherein the first clamping unit comprises:
   a first mounting frame mounted at the third sliding plate of the first vertically-movable means;
   a connecting frame connected to the first mounting frame through a connecting block and having an upper portion at which a slot is formed along a length direction thereof;
   a first operating cylinder having an operating rod and having a lower end fixedly mounted at a lower portion of the connecting frame through a fixing block;
   a first clamping cylinder having an operating rod, a lower end connected to an upper end of the operating rod of the first operating cylinder, and an upper portion at which a first clamper body is mounted, a lower portion of the first clamper body being movably connected to the slot so as to be movable upward and downward by operation of the first operating cylinder;
   a first clamper having a side hinged to an upper portion of the first clamper body and a rear end hinged to the operating rod of the first clamping cylinder; and
   a first pusher mounted at a front end of the first clamper, and being configured and arranged to apply pressure to an upper portion of the panel.

9. The apparatus of claim 8, wherein the first pusher comprises:
   a first pusher rod disposed at the front end of the first clamper and slidably mounted at the first clamper when it passes through the first clamper;

a pusher end fixedly mounted at a lower end of the first pusher rod and adapted to contact the upper portion of the panel; and a first elastic member disposed between the first clamper and the pusher end, the first elastic member being configured and arranged to apply elastic force to the pusher end.

10. The apparatus of claim 8, wherein a settling pad for mounting a lower portion of the panel is mounted at an upper end of the first mounting frame.

11. The apparatus of claim 1, wherein the second vertically-movable means comprise:

a second supporting post mounted on an upper portion of the second sliding plate;

a fourth rail housing mounted at the second supporting post and to which a fourth sliding plate is slidably coupled;

a fourth drive motor mounted at a lower end of the fourth rail housing and having a rotational shaft connected to a fourth ball screw;

a fourth guide rail mounted at the second supporting post in the fourth rail housing through a fourth plate; and a fourth rail block connected to the fourth sliding plate, the fourth rail block having an interior in which the fourth ball screw is inserted such that the fourth rail block is reciprocated along the fourth guide rail when the fourth ball screw is rotated by the fourth drive motor.

12. The apparatus of claim 11, wherein a fourth brake is mounted between the rotational shaft of the fourth drive motor and the fourth ball screw.

13. The apparatus of claim 11, wherein the second clamping unit comprises:

a first connecting plate mounted at the fourth sliding plate of the second vertically-movable means;

a first locator mounted at the first connecting plate and adapted to support the lower portion of the panel;

a second clamping cylinder having an operating rod and having a lower end hinged to the first locator;

a second clamper having a side hinged to an upper end of the first locator and a rear end hinged to the operating rod of the second clamping cylinder; and a second pusher mounted at a front end of the second clamper and adapted to apply pressure to the upper portion of a panel supported on an upper portion of the first locator by rotation of the second clamper.

14. The apparatus of claim 13, wherein the first locator comprises:

a first locator body mounted at the first connecting plate;

a first mounting block mounted at an upper portion of the first locator body;

a first rotatable ball rotatably mounted at the mounting block;

a first supporting pad connected to the first rotatable ball; and a first coil spring interposed between the first supporting pad and the first rotatable ball.

15. The apparatus of claim 14, wherein a first guider is mounted at a position of the first locator body corresponding to the first supporting pad.

16. The apparatus of claim 13, wherein the second pusher comprises:

a second pusher rod slidably mounted so as to move upward and downward at the second clamper when the second pusher rod passes through a front end of the second clamper;

a pressing block fixedly mounted at a lower end of the second pusher rod and adapted to contact the upper portion of the panel; and a second elastic member disposed between the second clamper and the pressing block, and being configured and arranged to apply elastic force to the pressing block.

17. The apparatus of claim 1, wherein the third vertically-movable means are vertically mounted at both end portions of a second connecting plate mounted at the second sliding plate of the second movable unit disposed at the rear portion of the base plate.

18. The apparatus of claim 17, wherein the third vertically-movable means comprise:

a third supporting post mounted vertically at the second connecting plate;

a fifth rail housing mounted at the third supporting post and to which a fifth sliding plate is slidably coupled;

a fifth drive motor mounted at a lower end of the fifth rail housing and having a rotational shaft connected to a fifth ball screw;

a fifth guide rail mounted at the third supporting post in the fifth rail housing through a fifth plate; and a fifth rail block connected to the fifth sliding plate, the fifth rail block having an interior in which the fifth ball screw is inserted so as to be reciprocated along the fifth guide rail when the fifth ball screw is rotated by the fifth drive motor.

19. The apparatus of claim 18, wherein a fifth brake is mounted between the rotational shaft of the fifth drive motor and the fifth ball screw.

20. The apparatus of claim 18, wherein the third clamping unit comprises:

a second locator mounted to be movable upward and downward at the fifth sliding plate, and configured and arranged to support a rear lower portion of the panel;

a third clamping cylinder having an operating rod and having a rear end hinged to the second locator;

a third clamper having a side hinged to an upper end of the second locator and a rear end hinged to the operating rod of the third clamping cylinder; and a third pusher mounted at a front end of the third clamper and adapted to apply pressure to the upper portion of a panel supported on an upper portion of the second locator by rotation of the third clamper.

21. The apparatus of claim 20, wherein the second locator comprises:

a second locator body mounted at the fifth sliding plate;

a second mounting block mounted at an upper portion of the second locator body;

a second rotatable ball rotatably mounted at the mounting block;

a second supporting pad connected to the second rotatable ball; and a second coil spring interposed between the second supporting pad and the second rotatable ball.

22. The apparatus of claim 21, wherein a second guider is mounted at a position of the second locator body corresponding to the second supporting pad.

23. The apparatus of claim 20, wherein the third pusher comprises:

a third pusher rod slidably mounted so as to slide upward and downward at the third clamper when the third pusher rod passes through a front end of the third clamper;

a pressing block fixedly mounted at a lower end of the third pusher rod and adapted to contact the upper portion of the panel; and a third elastic member disposed between the third clamper and the pressing block so as to apply elastic force to the pressing block.

24. The apparatus of claim 1, further comprising a supporting unit for supporting a lower center portion of the panel between the first movable units, and wherein the supporting unit comprises:
- a fourth supporting post mounted on the base frame between the first movable units;
- an ascending/descending cylinder mounted at the fourth supporting post, the ascending/descending cylinder having an operating rod; and
- a supporting block mounted at an upper end of the operating rod and adapted to support the lower center portion of the panel according to forward or backward operation of the ascending/descending cylinder.

\* \* \* \* \*